April 24, 1962 C. S. MORRISON ET AL 3,030,756
HEADER FOR HARVESTING CASTOR BEANS
Filed Aug. 4, 1959 4 Sheets-Sheet 1
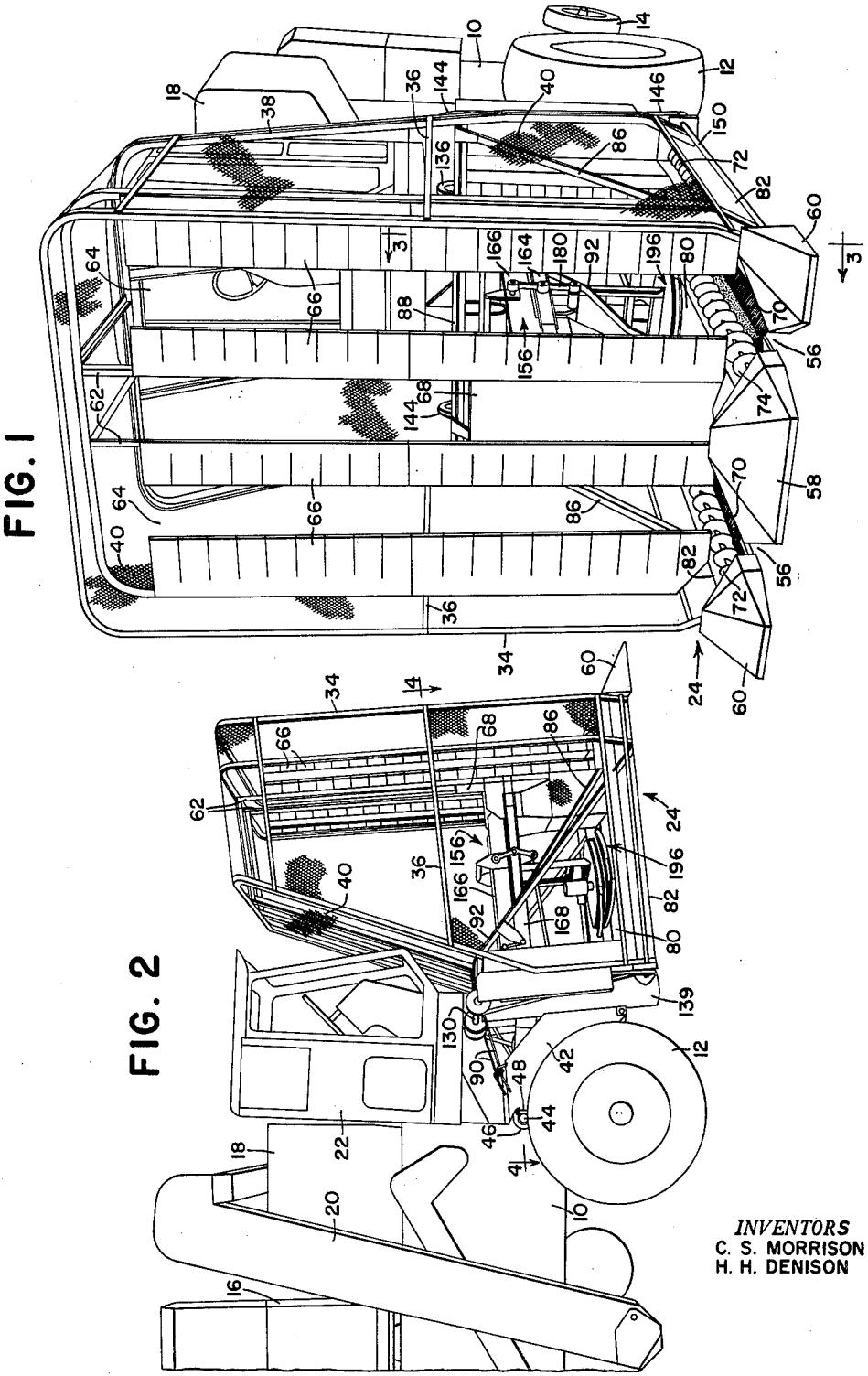
INVENTORS
C. S. MORRISON
H. H. DENISON April 24, 1962 C. S. MORRISON ETAL 3,030,756
HEADER FOR HARVESTING CASTOR BEANS
Filed Aug. 4, 1959 4 Sheets-Sheet 2

INVENTORS
C. S. MORRISON
H. H. DENISON

INVENTORS
C. S. MORRISON
H. H. DENISON

April 24, 1962 C. S. MORRISON ET AL 3,030,756
HEADER FOR HARVESTING CASTOR BEANS
Filed Aug. 4, 1959 4 Sheets-Sheet 4
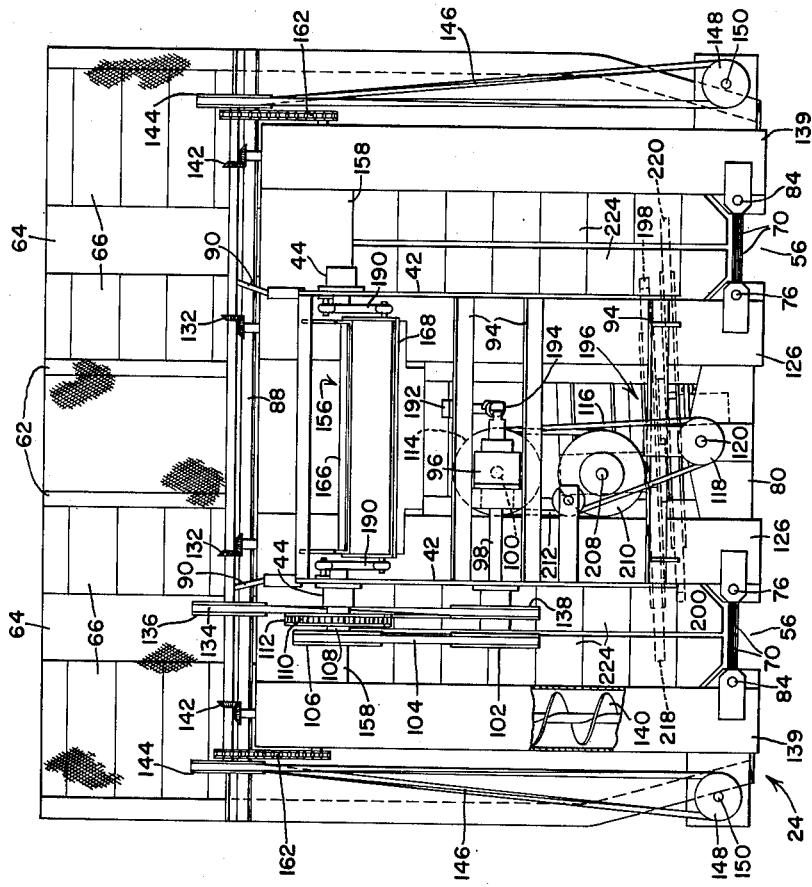
INVENTORS
C. S. MORRISON
H. H. DENISON

United States Patent Office 3,030,756
Patented Apr. 24, 1962

3,030,756
HEADER FOR HARVESTING CASTOR BEANS
Charles S. Morrison and Henry H. Denison, Moline, Ill., assignors to Deere & Company, Moline, Ill., a corporation of Delaware
Filed Aug. 4, 1959, Ser. No. 831,646
13 Claims. (Cl. 56—19)

This invention relates to a harvester and more particularly to a specialized harvester for gathering castor beans and like crops. Still more particularly the invention relates to a harvester attachment for a typical agricultural combine, whereby the combine may utilize many of its original parts in association with the specialized header which replaces the conventional grain header.

As is well known to those versed in the art, the harvesting of a castor bean crop is a somewhat more specialized operation than that involved in harvesting grain or similar crops, primarily because of certain peculiarities of the castor bean plant. Experience has shown that castor bean plants when normally grown in rows about forty inches apart and harvested seasonably produce highly desirable yields, which are significant in view of recent discoveries of new uses for castor oil. In the past, mechanical harvesting of the beans was relatively limited, and many efforts have been made to develop new varieties of plants which more readily lend themselves to mechanical harvesting. The plants grow to substantial heights, on the order of six feet or more, and the seeds are grown in such manner that harvesting is best accomplished by dislodging them from the stalks without damaging the stalks. The seeds or capsules must then be treated by separating means for the purpose of separating the capsules from trash such as sticks, leaves, etc. The most familiar type of separator is known as a "scalper" (see U.S.D.A. Bull. ARS 42–8 and U.S. patent to Suverkrop 2,952,962, both of record here) and is ordinarily associated with a conveyor of some type which conveys the capsules to hulling means for removing the hulls from the capsules, and ultimately the capsules are collected and delivered to processing plants and other points. In the prior art, the basic harvester requires a specialized machine throughout. According to the present invention, the specialized header, plus several improvements, is constructed to be attached to a conventional combine which requires only slight modification to adapt itself to the hulling and cleaning steps in the harvesting and separating processes. It is an object of the invention to provide the header with harvesting means comprising rotary means operative on a plurality of rows to engage or vibrate the stalks substantially at a common level so as to dislodge the capsules therefrom. The header features a compact organization in which the harvesting means is disposed between a pair of row-receiving passageways, together with separator or scalper means located above the harvesting means so as to be self-contained as respects the header, whereby the separator or scalping means need not be provided as part of the vehicle which carries the header, as in the prior art, wherein special vehicles are provided. Since it is a feature of the present invention to provide the header as an attachment for the combine, the self-contained feature of the scalper in the header rather than in the combine improves the relaitonship between the combine and the attachment. In its overall aspects, the invention aims to provide a novel and inexpensive design having many improvements over prior known mechanisms.

The foregoing and other important objects and desirable features inherent in and encompassed by the invention will become apparent as a preferred embodiment thereof is disclosed, by way of example, in the ensuing description and accompanying sheets of drawings, the several fingures of which are described immediately below.

FIG. 1 is a front three-quarter perspective of the header attachment mounted on a typical combine.

FIG. 2 is a perspective, on a reduced scale, of the forward part of the complete machine as seen from the right hand side thereof.

FIG. 5 is a rear view of the header attachment as seen generally along the line 5—5 of FIG. 4.

FIG. 6 is a fragmentary sectional view as seen along the line 6—6 of FIG. 4.

FIG. 7 is a fragmentary section as seen along the line 7—7 of FIG. 4.

Figure 3:
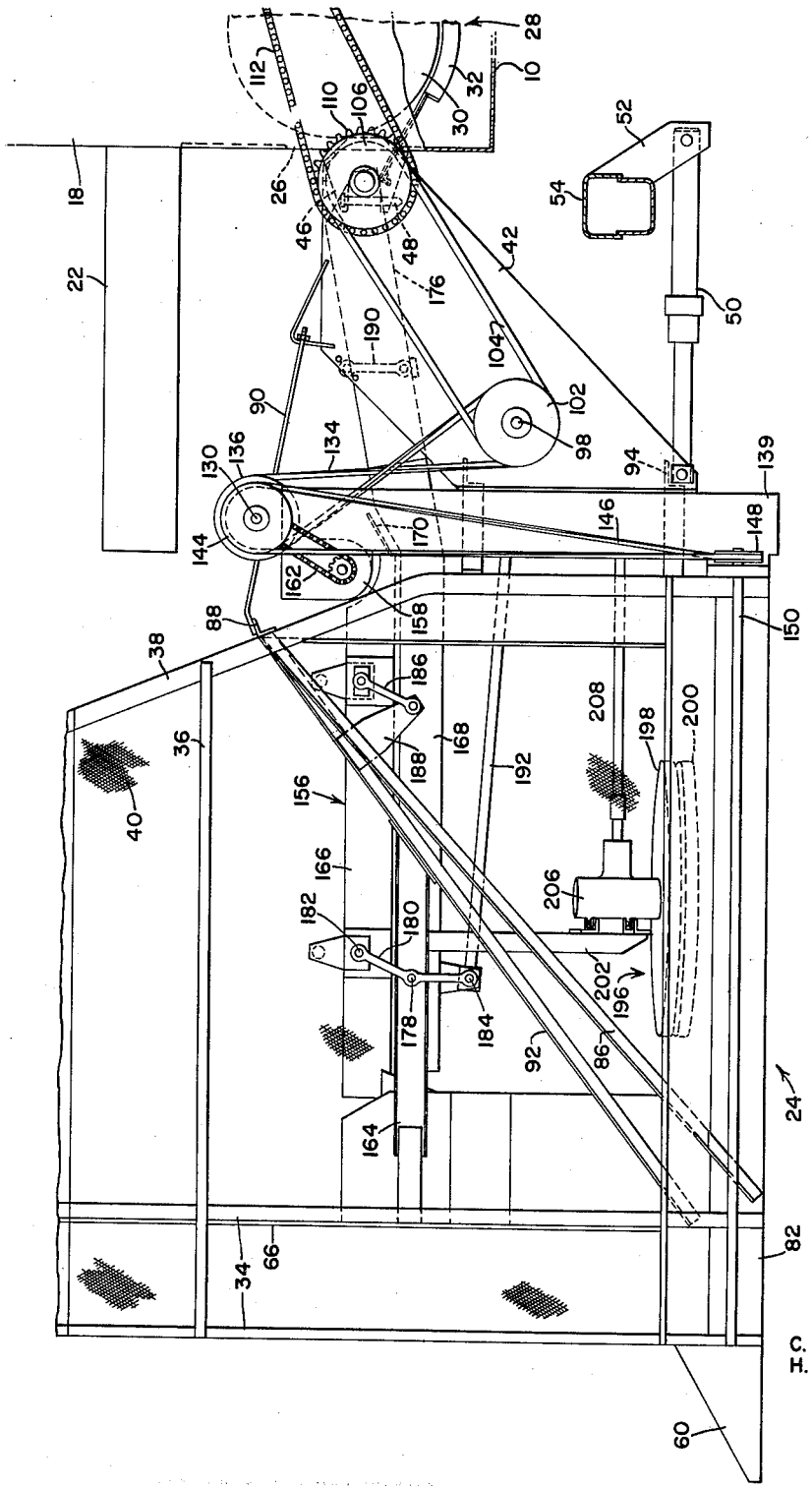
FIG. 3 is an enlarged fragmentary side elevation of the harvesting unit shown in relation to a forward portion of the combine as seen generally along the line 3—3 on FIG. 1 and with the combine axle shown in section and a portion of the combine body broken away to show the hulling cylinder.

Those familiar with the general nature of a typical self-propelled combine will recognize in FIGS. 1 and 2 such a combine as having a fore-and-aft separator body 10 carried on relatively widely spaced front traction wheels 12 and steerable rear wheels 14. The body carries thereon, in any suitable fashion, its own source of power, such as an internal combustion engine, located in the area designated 16, and ahead of this is a conventional grain tank 18 to which a conveyor 20 leads. The forward part of the body is provided with an operator's station 22 at a relatively high level to give the operator a good view of the harvesting operation as carried on by the particular header carried by the machine. In the present case, the conventional grain header is removed and is replaced by the specialized header, indicated in its entirety by the numeral 24.

Figure 4:
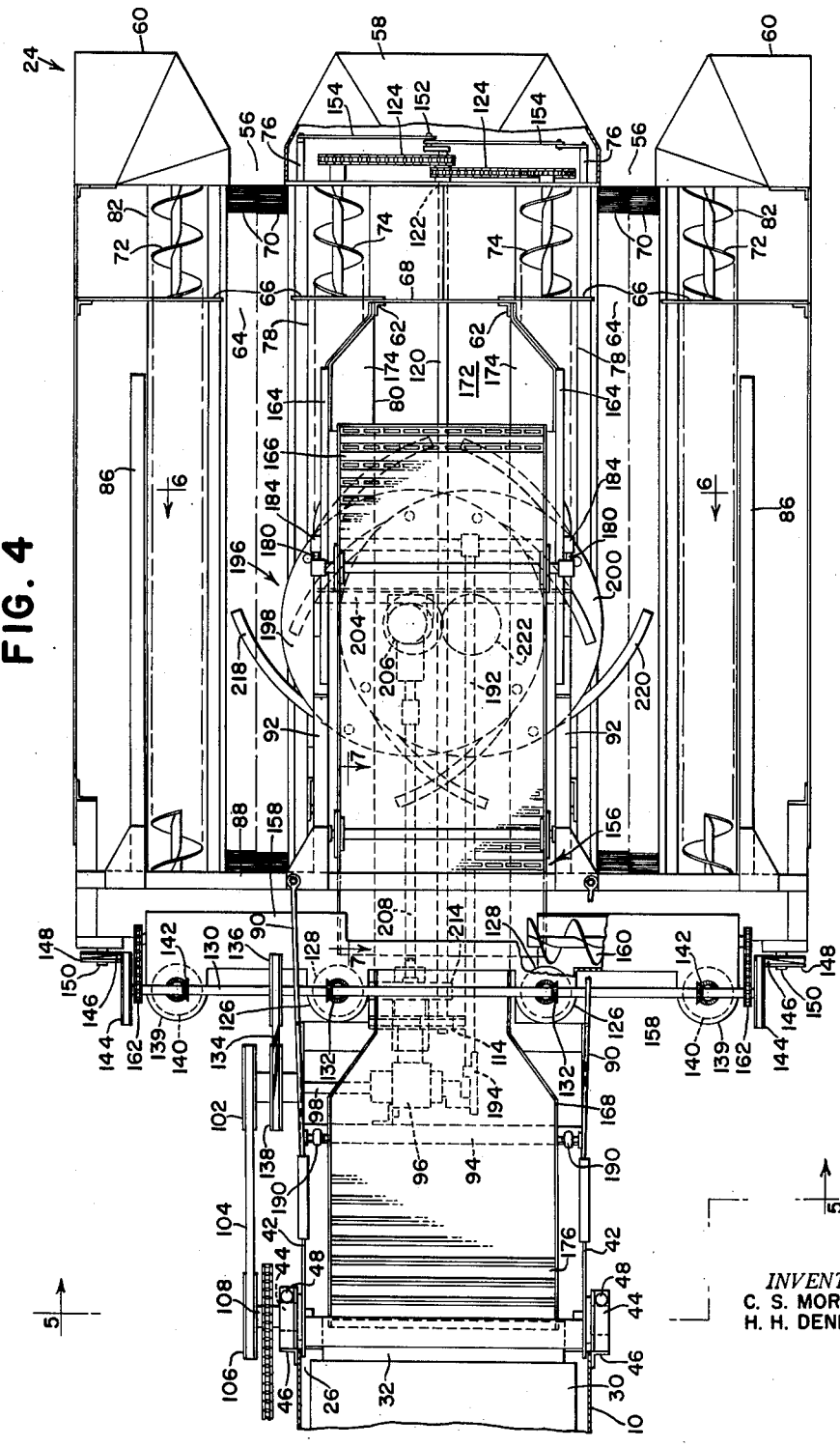
FIG. 4 is a plan view, on an enlarged scale, as seen generally along the line 4—4 of FIG. 2.

As best seen in FIGS. 3 and 4, the combine body 10 has a forwardly facing crop inlet opening 26 and, when the machine is typically associated with a grain header (not shown), the grain is delivered through this opening to the threshing mechanism, a main part of which comprises the conventional threshing cylinder. In the present case, the combine is modified to the extent of substituting hulling means 28 for the conventional cylinder and concave. In the present case, the hulling means preferably takes the form of a rubber-covered cylinder 30 which cooperates with a rubber-covered concave 32. The use of cooperative rubber covered surfaces for hulling castor beans is old and well known, as in the U.S. patent to Hansen 2,662,570. At this point, it should be recognized that other types of hulling means are known and the particular type shown here is not intended in any way to limit the application of the invention as embodied either in the header per se or the feature of attaching the header to a typical combine.

The header comprises a framework made up of a plurality of frame members 34, 36 and 38 which, together with other frame members not material here, establish a box-like structure which is preferably equipped with panels of any representative wire mesh, as shown generally at 40. The structure is provided preferably of such nature that it may be separated in a horizontal plane in the area of the frame parts 36 so that a top of lower height than that shown may be added, whereby the machine may be adapted to castor bean plants of lower heights. In the present case, the machine is adapted to accept plants up to ten feet high. When converted as just suggested, the machine will operate satisfactorily on plants up to six feet high. The basic idea of a wire mesh box-like structure is generally old (see for example U.S.D.A. Bull.; ARS 42–8, February 1957) and the purpose of the design is to adapt a machine to the harvesting of castor beans which, as previously pointed out, involves the knocking or vibrating of the standing stalks so that the castor beans are dislodged therefrom. The wire mesh affords adequate confining of the dislodged beans and also enables the operator to have a good view of the harvesting operation.

The header as a unit may be regarded as having front and rear ends, the latter of which includes a pair of laterally spaced apart rearwardly extending support members or side sheets 42 which have coterminous rear ends provided respectively with transversely coaxial mounting means in the form of trunnions 44. The forward end of the combine body 10 is typically provided with a pair of laterally spaced apart mounting portions 46 which normally mount the conventional grain header. In the present case, these mounting portions are utilized to respectively receive the trunnions 44 and this means, together with retaining pins 48, adequately mounts the header on the combine as a cooperative part thereof. The trunnions provide a pivot on a transverse horizontal axis about which the header may be adjusted relative to the combine. An elevated position of the header is shown in FIG. 2. FIG. 1 shows the header in its normal down or operating position. The adjustments may be effected by means of hydraulic cylinders 50, for example, connected between lower rear parts of the header and brackets 52 carried on the transverse axle 54 of the combine, which axle extends, of course, between the traction wheels 12, as is well known to those versed in the art. Any suitable means may be utilized for expanding and contracting the cylinders 50. Actually, any adjustable means other than those illustrated may be used to accomplish the same purpose. Here again, the detail does not impose any limitations on the broad aspects of the invention.

The lower part of the header represents means affording a pair of fore and aft stalk-receiving passageways 56 which respectively receive the row-planted crops as the machine advances. The forward end of the header includes suitable dividers, including a central divider 58 and a pair of outer dividers 60, for adequately guiding the plants into the passageways.

The forwardly located upright frame parts 34, together with a pair of laterally spaced apart central frame parts 62, give the front of the header an arch-like appearance affording a pair of vertical openings 64 respectively in fore-and-aft alinement with the passageways 56. Each side of each opening is bordered with flexible means, such as canvas-reinforced rubber, to provide a series of flaps 66 for facilitating the entry of plants into the passageways. The lower half of the space between the central uprights 62 is closed as by a sheet or plate 68, the purpose of which will appear subsequently.

Each passageway 56 is made up in part of a pair of fore-and-aft flexible elements, here in the form of cooperating brushes 70 which extend the length of the respective passageways. The general theory of operation is that the plants enter the passageways 56 and are vibrated or engaged by harvesting means, to be described later, with the result that the seed capsules are dislodged from the plants and dropped onto the brushes 70. The brushes are so arranged that the capsules cannot fall back to the ground but instead are moved laterally to capsule receivers, here in the form of a pair of fore and aft augers 72 and 74 which flank each passageway 56. The brushes are preferably oscillated upwardly from and back to the positions shown in FIG. 6, and for this purpose the brushes are mounted on fore-and-aft shafts, as represented by the numeral 76 for what may be regarded as the inner brushes. As best seen in FIG. 6, the shafts 76 are carried respectively by troughs 78 for the augers 74. The augers are part of a central fore-and-aft box-like supporting portion 80 which runs lengthwise of the machine to afford rigidity for the lower part of the frame. It will be understood that troughs 82 respectively for the augers 72 run lengthwise of the header and add to the strength of the structure as well as providing troughs for the respective augers. Shafts 84 for the other of the brushes 70 are visible in FIG. 5. Outer brace bars 86 incline upwardly and rearwardly from forward portions of the auger troughs 82 to the rear frame parts 38 of the framework, and these are in turn cross connected by a transverse bar 88 from which tension braces 90 extend rearwardly to upper portions of the side sheets or mounting plates 42. Additional or inner braces 92 are rigidly connected at their rear ends to the cross bar 88 and incline downwardly and forwardly and are secured at their lower ends to forward portions of the header, particularly as represented by the uprights 62 and are connected at their forward ends to the central forward portion of the header as represented by the junction between the central box-like section 80 and the central uprights 62 (FIG. 4).

The rear portion of the header includes, in addition to the mounting plates or side sheets 42, a plurality of suitable cross braces 94 which extend between and are rigidly connected to the members 42. The upper pair of braces 94 carries a gear box 96 which has a laterally projecting shaft 98 as well as a forwardly projecting shaft 100. The shaft 98 has keyed to its outer end a sheave 102 which receives a belt 104 which is in turn trained about a sheave 106 journaled on a shaft 108 which is coaxially mounted in the trunnions 44. In addition, the shaft 108 journals a sprocket 110 which is connected to the sheave 106 and driven by a chain 112 from a source of power on the combine. For present purposes, the chain 112 may be regarded as a driving element powered by the combine power source.

The shaft 100 carries a first sheave 114 thereon which, via a belt 116, drives a sheave 118 coaxially keyed to the rear end of a fore-and-aft shaft 120, the forward end of which is journaled in any suitable bearing in a forward part of the header, as represented generally by the numeral 122 in FIG. 4. The shaft 120 projects ahead of the support at 122 and carries suitable sprockets which by means of chains 124 drive the augers 74. The lead of each auger and the direction of rotation thereof is such that seed capsules received thereby from the associated brushes 70 are moved rearwardly. Each of the augers 74 discharges at its rear end into an upright tube 126 in which is coaxially journaled a vertically moving auger 128.

The augers 128 are driven by means including a jackshaft 130 which extends transversely across the rear part of the header, being journaled in any suitable bearings, the details of which are not material here. Each of the shafts for the augers 128 is bevel-gear driven, as at 132, from the jackshaft 130, and the jackshaft is in turn belt-driven at 134 by a twisted belt trained about a sheave 136 on the jackshaft and a second sheave 138 on the previously described shaft 98. The belt 134 is twisted to produce the proper direction of rotation.

Each of the outer augers 72 moves seed capsules rearwardly for discharge into outer upright tubes 139, and a vertically moving auger 140 in each tube 139 is bevel-gear driven at 142 from the jackshaft 130.

Each of the terminal ends of the jackshaft 130 has keyed thereto a sheave 144 about which is trained a twisted belt 146 which is also trained about a sheave 148 at the rear end of a fore-and-aft shaft 150. These shafts lie respectively laterally outwardly of the associated augers 72 and project at their forward ends beneath the respective outer divider 60, in which areas they are connected by suitable drive means (not shown) to forward ends of the shafts for the augers 72. The drive may be similar to that previously described at 124 by means of which the shaft 120 drives the inner augers 74. These details are not material. The shaft 120, in addition to driving the augers 74 via the chains 124 as just mentioned, also oscillates the shafts 76 for the inner of the brushes 70. This means is represented by a crank 152 on the forward end of the shaft 120 and pitman links 154 connected between the crank and the respective shafts 76. The forward ends of the shafts 150 may respectively drive similar mechanism for oscillating the outer of the brushes 70. The representative illustration of the driving mechanism at the central part of the machine will serve to establish a basis for the use of similar mechanism at each of the outer portions of the header.

Seed capsules carried rearwardly by the augers 72 and 74 to the upright augers 140 and 128 are ultimately delivered to a central upper rear portion of the header, at which point they are received by separator means, commonly called a scalper or scalping means, as previously explained, here indicated in its entirety by the numeral 156. The means for effecting the central delivery from the outer augers 140 is established by laterally inwardly projecting auger tubes 158, each of which carries a cross auger 160 operative to deliver into the rear or inlet end of the scalper 156. The augers 160 are chain driven at 162 from the jackshaft 130.

The previously described downwardly and forwardly extending braces 92, plus other supporting structure, afford means for mounting the scalper 156. For this purpose, the braces 92 are augmented by forwardly extending structural supports 164, which extend forwardly from the braces at a relatively high level and which are secured at their forward ends to the central uprights 62. It is in this area that the transverse front sheet or plate 68 cross connects the members 62 at a height substantially at the same level as that of the members 164, thus closing off the forward upper part of the central section 80 from the scalper area. As will be brought out below, trash discharged by the scalper is thus prevented from reentering the forward portions of the inner augers 74.

The scalper 156 comprises upper and lower pans or devices 166 and 168 respectively, and these are arranged fore-and-aft and are carried by the header 24 exclusively of the combine, which is a feature of the present invention, since the combine need not be modified to perform the scalping function. The upper pan or device includes or is in the form of a perforated sheet metal structure of zig-zag or saw-tooth configuration as viewed in elevation (FIG. 7), with the inclination of the teeth such that when the pan is oscillated, material delivered thereto at its rear end will move forwardly. The pan 168 is of similar but reversed construction and also does not have any perforations, and in this case the teeth are designed so that oscillation of the pan 168 causes material to move rearwardly. The theory of operation is that the castor bean capsules are delivered to the rear end of the upper pan 166 by the cross augers 160, the pan being supplemented by a plate or shield 170 so that the capsules are delivered to the pan 166 exclusively of the lower pan 168. As the upper pan oscillates, the capsules move forwardly and are sifted through the perforations, falling onto the lower pan 168. The trash, such as sticks, leaves, etc., moves forwardly because of the action of the saw teeth in combination with the oscillation of the scalper, and this trash is ultimately discharged at the front end of the scalper, dropping to the ground through the area designated 172 (FIG. 4). In this area, the center box-like section 80 has its top removed so that the trash may drop directly to the ground. The auger troughs 78 for the inner augers 74 are shielded at 174 in this area so that trash does not enter therein.

As the separated capsules drop onto the lower pan 168, the oscillation causes the capsules to move rearwardly onto a lower pan rearward extension 176 which represents the rear or discharge end of the lower pan. This extension delivers through the combine front opening 26 to the hulling means 28 and the hulling means removes the hulls from the capsules. The remainder of the combine may be modified to a sufficient extent to handle the further cleaning and separating functions required, but it will be found in normal circumstances that the conventional combine shoe will perform satisfactorily. However, this may be modified to suit any particular situation. As in the case of a typical combine, the cleaned material is ultimately delivered to the grain tank, as at 18 here, via the elevator 20.

The scalper 156 is mounted in the manner best shown in FIGS. 3, 4 and 6, wherein it will be seen that the supports 164 carry, on coaxial pivots 178, a pair of bell cranks 180, the upper end of which is pivotally connected at 182 to the upper pan 166 and the lower end of which is pivotally connected at 184 to the lower pan 168. A rearward part of the upper pan 166 is supported by a link 186 from a bracket 188 carried by the brace 92, it being understood that the construction is the same at both sides of the scalper. The rear extension 176 of the lower pan 168 is supported by a link 190 from pivotal connections on the side plates 42. Because of the supporting linkages just described, the pans oscillate simultaneously but in opposite directions. The driving means for effecting oscillation comprises a pitman 192 connected at its front end to the cross shaft to which the pivots 184 are common. The rear end of the pitman 192 is connected to a crank 194 on a shaft that projects outwardly from a previously described gear box 96. This shaft may be a coaxial extension of the shaft 98.

As previously described, the harvesting of castor beans and like crops involves the operation of vibrating or otherwise acting on the stalks to cause dislodgement of the seed capsules therefrom, leaving the stalks remaining in the ground. As also previously described, the stalks are received in the passageways 56, and when the capsules are dislodged, they drop to the oscillating brushes 70 which cause the capsules to move laterally into the rearwardly moving augers 72 and 74 for ultimate delivery to the rear end of the scalper 156 via the augers 128, 140 and 160. The harvesting means for acting on the stalks is of novel construction and is identified in its entirety by the numeral 196.

This harvesting means or unit comprises upper and lower similar but oppositely driven rotary devices or elements 198 and 200. For the purpose of mounting the upper device, the header includes additional frame structure in the form of depending supports 202 having transverse members 204 which support a depending gear case 206 which in turn constitutes or incorporates an upper bearing having its terminal end mounting the upper device 198. The gear box or gear case may contain any suitable gearing which is driven by a fore-and-aft shaft 208, the rear end of which carries a sheave 210 driven by a belt 212 from a second sheave 214 on the previously described shaft 100 that projects forwardly from the gear case 96. The axis of the shaft (not shown) carried by the bearing is inclined upwardly and toward the nearer of the two auger troughs 78, this axis being offset toward that trough. The lower device 200 is carried on any suitable lower bearing, as at 216, which provides an axis parallel to that established by the bearing or gear box 206, and the axis at 216 is offset to the other side of the median plane of the header, being nearer to the other auger trough 78 and, with respect to that auger trough, inclining upwardly and away from that trough. As best seen in FIG. 4, the upper and lower devices are essentially circular or disc-like, and each is so dimensioned as to overlap the other in offset relationship as described relative to their axes. The unit as a whole is located centrally of the header and below the scalper 156. The devices respectively carry pivotally mounted knocker arms 218 and 220, rspectively, and when the devices rotate the arms are compelled outwardly. These may be regarded as peripheral parts on the devices which are so mounted and dimensioned that they operate on stalks in their own respective passageways exclusively of the other passageway. For example, as seen in FIG. 6, the knocker arms 218 extend outwardly into and over the passageway 56 at the right hand side of the figure, while the knocker arms 220 on the lower device 200 extend only over and into the passageway 56 at the left hand side of the figure. The two devices are geared together by first and second gears at 222 so that they rotate simultaneously, the same speed, but in opposite directions of rotation.

Another feature of the arrangement is the inclined mounting of the devices on the axes established respectively by the bearings or journals at 206 and 216. The novel and desirable feature of this arrangement is that the knocker arms 218 and 220 operate on their respective plants at substantially the same level, which would not be the case were the axes vertical. This is consonant with the theory of striking the plants at desirable locations relative to the ground and relative to the seed capsules growing thereon.

As the machine advances along the rows of stalks, the stalks ultimately pass rearwardly through the rear ends of the passageways 56, and in these areas the header is provided with a rear set of flexible flaps at 224 as is conventional, one set being located in each passageway. These flaps have their inner terminal edges relatively closely spaced apart but of course are yieldable as the plants pass therethrough during advance of the machine so that if any capsules remain on the plants, they will be stripped or brushed therefrom and caused to fall forwardly into the augers 72 and 74. These flaps perform the further usual function of confining flying capsules to the header. Capsules falling from high areas on the plants may of course fall directly into the scalper 156, which is not undesirable.

From the foregoing description, it will be seen that the header provides a desirable piece of equipment for harvesting castor beans and like crops. The plants are expeditiously handled by the several mechanisms, the stalks being received in the passageways 56 for engagement by the harvesting means 196 so that the capsules are dislodged to drop into the augers 72 and 74 for ultimate delivery to the oscillating scalper 156, the operation of which has been described above. The header is self-contained, performing a relatively high proportion of the cleaning of the capsules before they reach the hulling means 28. This is part of the significance of the invention which resides in the design of the header as an attachment for a typical combine in substitution for the conventional grain header. As already indicated, the combine may be slightly modified to accommodate the peculiarities of the castor beans or like crop.

Features and advantages of the invention, other than those categorically enumerated, will readily occur to those versed in the art, as will many modifications and alterations in the preferred embodiment of the invention disclosed herein, all of which may be achieved without departure from the spirit and scope of the invention.

What is claimed is:

1. A castor bean and like harvester attachment for a combine of the type having a fore-and-aft body including a forwardly facing crop inlet opening and wherein the body is provided with hulling means immediately rearwardly of said opening, comprising: a header positionable ahead of the body and having means thereon for connection to said body for support thereon; harvesting means on the header for operating on at least one row of castor beans and like plants for receiving the seed capsules therefrom; and means on the header including a separator for separating trash from the capsules and for moving the capsules through the aforesaid opening and to the hulling means.

2. A castor bean and like harvester attachment for a combine of the type having a fore-and-aft body including a forwardly facing crop inlet opening and wherein the body is provided with hulling means immediately rearwardly of said opening, comprising: a header positionable ahead of the body and having means thereon for connection to said body for support thereon; harvesting means on the header for operating on at least one row of castor beans and like plants for removing the seed capsules therefrom; separator means carried by the header for separating trash from the capsules; means on the header for moving the capsules from the harvesting means to the separator means; and means on the header for moving the capsules from the separator means and through the aforesaid opening and to the hulling means.

3. A castor bean and like harvester attachment for a combine of the type having a fore-and-aft body including a forwardly facing crop inlet opening and wherein the body is provided with hulling means immediately rearwardly of said opening, comprising: a header positionable ahead of the body and having front and rear portions; means on the rear portion for mounting the header on the body; harvesting means on the header for operating on at least one row of castor beans and like plants for removing the seed capsules therefrom; separator means on the header and including a fore-and-aft upper device for separating trash from capsules and having front and rear ends respectively adjacent to said front and rear header portions, said separator means further including a fore-and-aft conveyor element below and for receiving capsules from said upper device, said conveyor element having a rear discharge end leading to the hulling means via said opening; means on the header for moving harvested capsules to the rear end of the upper device; means for driving said upper device to cause capsules to drop to the conveyor element and to cause trash to exit from said device at the front end thereof; and means for driving the conveyor element to cause the capsules received from said device to move rearwardly to the hulling means via said rear discharge end.

4. A header for harvesting castor beans and the like comprising: supporting frame work adapted to advance along a row of plants; harvesting means on the header for operating on at least one row of castor beans and like plants for removing the seed capsules therefrom; separator means carried by the header for separating trash from the capsules and including front and rear ends, said separator means being operative to cause trash to exit therefrom at its front end and clean capsules to exit at its rear end; and means on the header for moving the capsules from the harvesting means to the separator means.

5. A header for harvesting castor beans and the like comprising: supporting framework adapted to advance along a row of castor beans and like plants; harvesting means on the header for operating on at least one row of plants for removing the seed capsules therefrom; separator means carried by the header for separating trash from the capsules; and means on the header for moving the capsules from the harvesting means to the separator means.

6. A header for harvesting castor beans and the like, comprising: supporting framework adapted to advance along a pair of parallel rows of castor beans and like plants and including a pair of laterally spaced apart means defining respectively a pair of relatively low, plant-receiving passageways; plant-engaging means on the framework centrally of the passageways for engaging plants to cause seed capsules to be dislodged therefrom; seed capsule receivers on the framework and respectively flanking the passageways for receiving the dislodged seed capsules; fore-and-aft separator means carried by the framework generally centrally between the passageways and at a level above the plant-engaging means and having an inlet portion and also capsule and trash outlet portions; means on the framework for elevating seed capsules from the receivers to the separator means; and means on the framework for operating the separator means to effect the separation of capsules from trash, to discharge trash at the trash outlet portion and to discharge cleaned capsules at said capsule discharge portion.

7. A header for harvesting castor beans and the like, comprising: supporting framework adapted to advance along a row of castor beans and like plants and including means defining a relatively low, plant-receiving passageway; plant-engaging means on the framework adjacent to the passageway for engaging plants to cause seed capsules to be dislodged therefrom; a seed capsule receiver on the framework and flanking the passageway for receiving the dislodged seed capsules; separator means carried by the framework at a level above the plant-engaging means and having an inlet portion and also capsule and trash outlet portions; means on the framework for elevating seed capsules from the receiver to the separator means; and means on the framework for operating the separator means to effect the separation of capsules from trash, to discharge trash at the trash outlet portion and to discharge cleaned capsules at said capsule discharge portion.

8. A header for harvesting castor beans and the like, comprising: supporting framework adapted to advance along a pair of parallel rows of castor beans and like plants and having laterally spaced apart means defining a pair of fore-and-aft plant-receiving passageways; plant-engaging means disposed centrally between the passageways and including upper and lower rotary devices arranged in overlapping relation and mounted on separate, laterally offset parallel axes inclined upwardly and laterally, said devices being similar and having peripheral plant-engaging parts each being so constructed and dimensioned as to cause its peripheral parts to engage plants in only one passageway, the inclination and offset of said axes being such that the peripheral parts of the lower device engage plants in one passageway at a level substantially the same as that at which the peripheral parts of the upper device engage plants in the other passageway.

9. A header for harvesting castor beans and the like, comprising: supporting framework adapted to advance along a pair of parallel rows of castor beans and like plants and having laterally spaced apart means defining a pair of fore-and-aft plant-receiving passageways; means on the framework providing a lower bearing on an axis offset from the centerline between the passageways toward one passageway and inclined upwardly and laterally away from said one passageway; a lower rotary device mounted on said bearing and having peripheral plant-engaging parts so diametrically dimensioned as to project into said one passageway exclusively of the other passageway; means on the framework providing an upper bearing on an axis parallel to said axis of the lower bearing and laterally offset toward the other passageway; an upper rotary device similar to and partially overlapping the lower device and mounted on the upper bearing and having peripheral plant-engaging parts so diametrically dimensioned as to project into said other passageway exclusively of said one passageway; and means for driving said devices.

10. The invention defined in claim 9, in which: the inclination and offset of the axes are such that the plant-engaging parts of the devices engage plants in the respective passageways at substantially the same level.

11. The invention defined in claim 9, including: drive gearing meshing between the two devices and including a first gear concentrically above and rotatable with the lower device and a second gear concentrically below and rotatable with the upper device.

12. The invention defined in claim 9, in which: the lower bearing includes a central supporting portion projecting upwardly and having an upper terminal end receiving the lower device, and the upper bearing includes a depending supporting portion having a lower terminal end receiving the upper device.

13. A header for castor beans and the like, comprising: a supporting frame adapted to advance along a row of castor beans and like plants; means on said frame at a relatively low level providing a fore-and-aft plant-receiving passageway; means closely above the passageway and carried by the frame for engaging plants received in said passageway for dislodging seeds from the plants; means on the frame closely adjacent to the passageway for receiving the dislodged seeds; separating means carried by the frame in substantially overlying relation to the dislodging means for separating seeds from trash; and means on the frame for moving seeds from the receiving means to the separating means.

References Cited in the file of this patent

UNITED STATES PATENTS

| | | |
|---|---|---|
| 1,262,559 | Pritchard | Apr. 9, 1918 |
| 1,270,448 | Scott | June 25, 1918 |
| 2,528,275 | Heth | Oct. 31, 1950 |
| 2,641,888 | Grether | June 16, 1953 |
| 2,656,667 | Smith | Oct. 27, 1953 |
| 2,834,172 | Wood | May 13, 1958 |

OTHER REFERENCES

U.S. Dept. of Agriculture publication of February 1957, No. ARS 42–8, "A Castor Bean Harvester for California."